May 1, 1962     W. FLIEG     3,032,163
DATA RECORDER AND ASSOCIATED METHODS
Filed Nov. 14, 1960     7 Sheets-Sheet 1
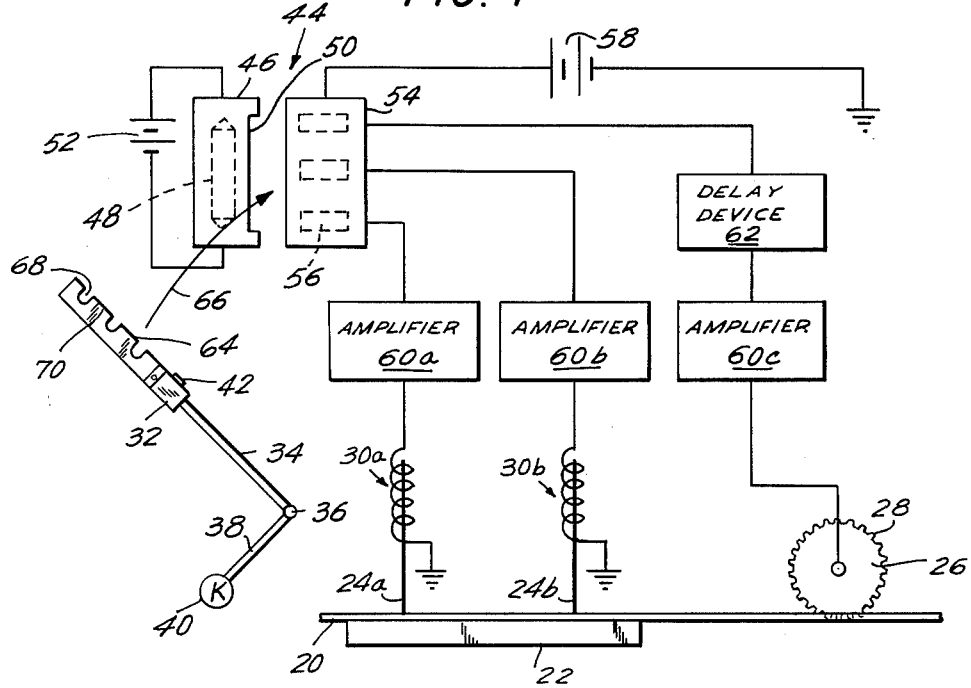
FIG. 1
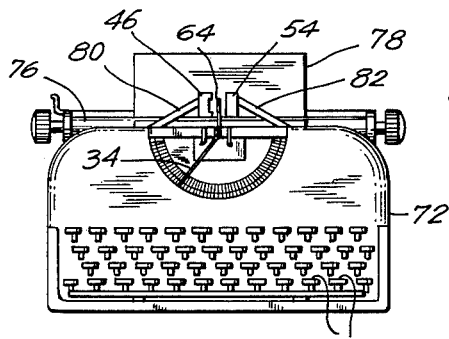
FIG. 2
FIG. 3
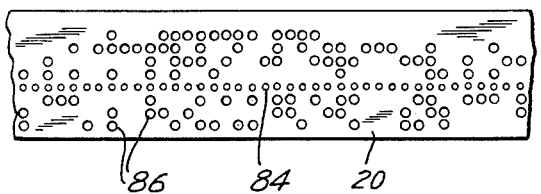
INVENTOR.
WERNER FLIEG
BY *Alan K. Roberts*
ATTORNEY

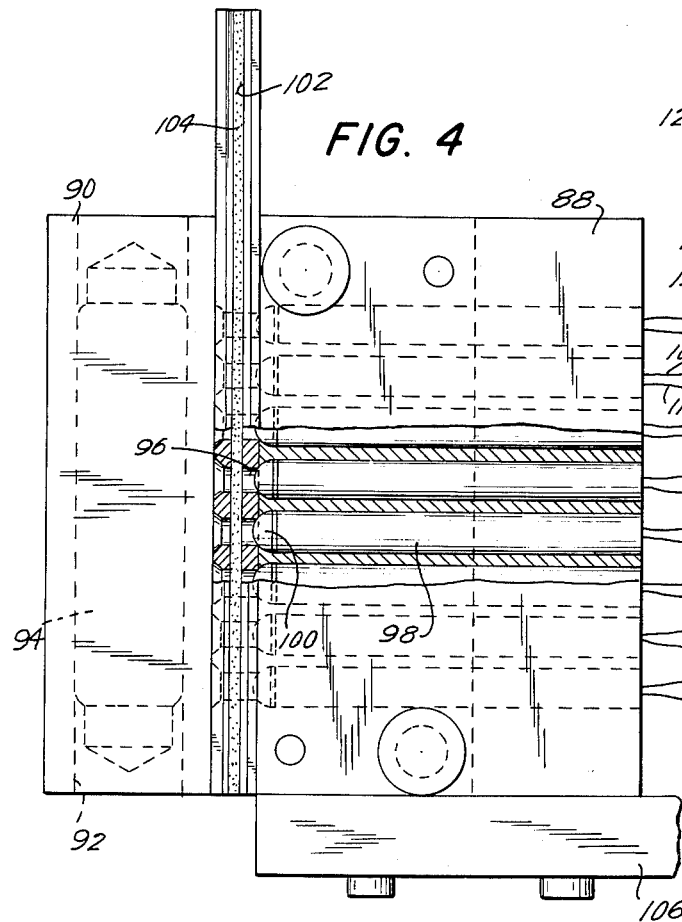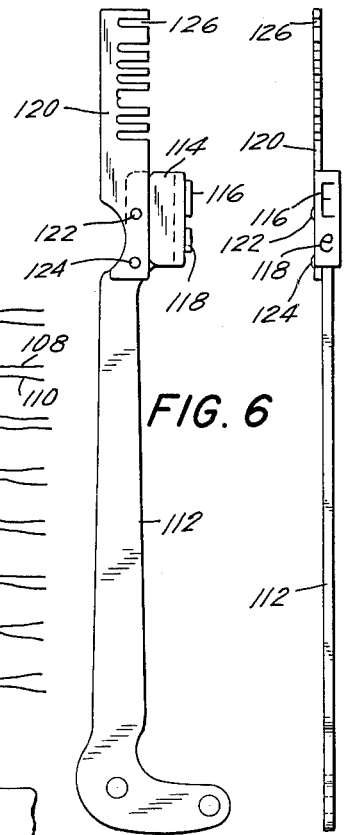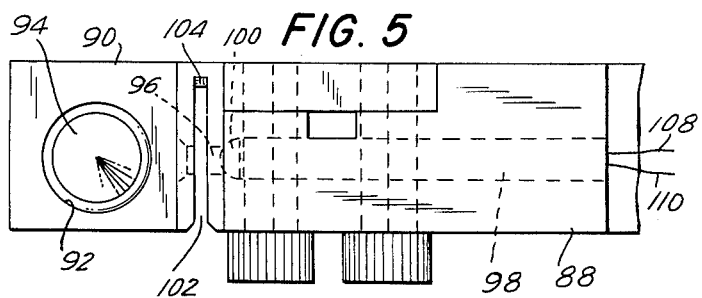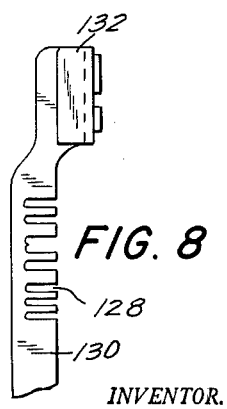

May 1, 1962 W. FLIEG 3,032,163
DATA RECORDER AND ASSOCIATED METHODS
Filed Nov. 14, 1960 7 Sheets-Sheet 3

INVENTOR.
WERNER FLIEG
BY
ATTORNEY

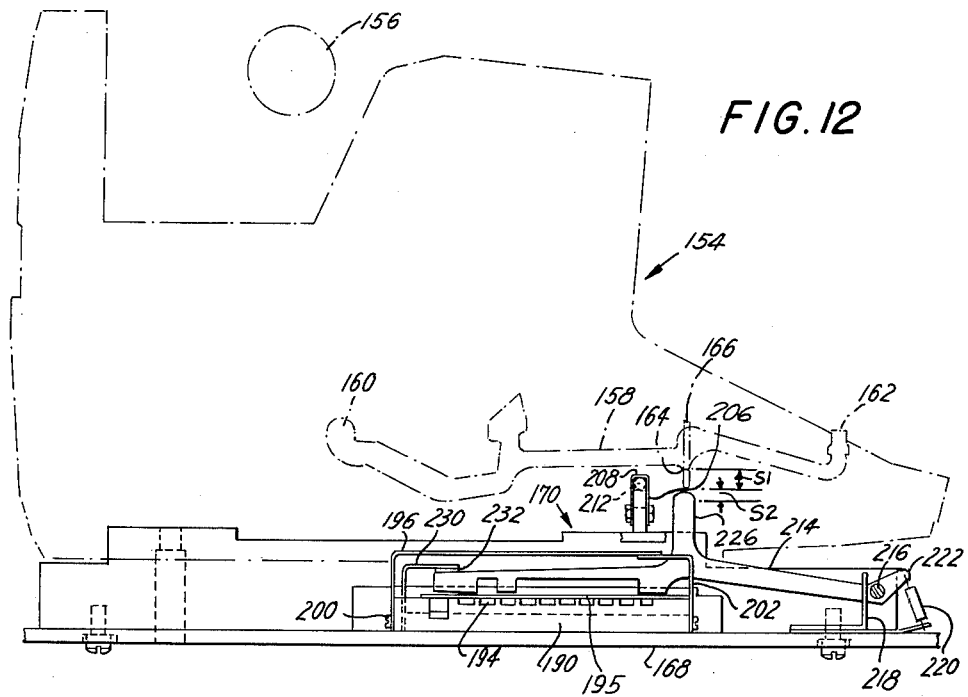

May 1, 1962 W. FLIEG 3,032,163
DATA RECORDER AND ASSOCIATED METHODS
Filed Nov. 14, 1960 7 Sheets-Sheet 5
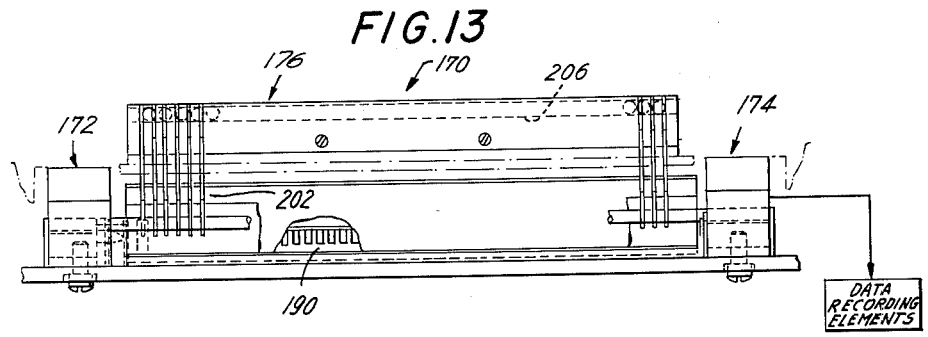
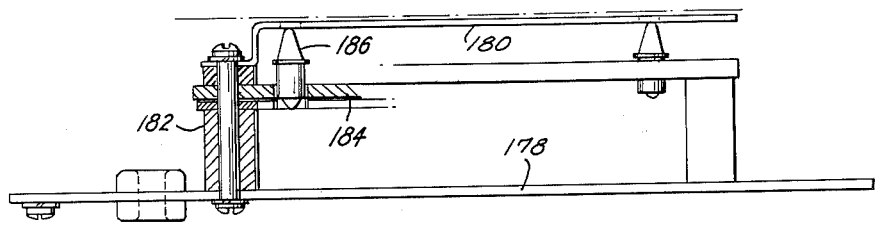
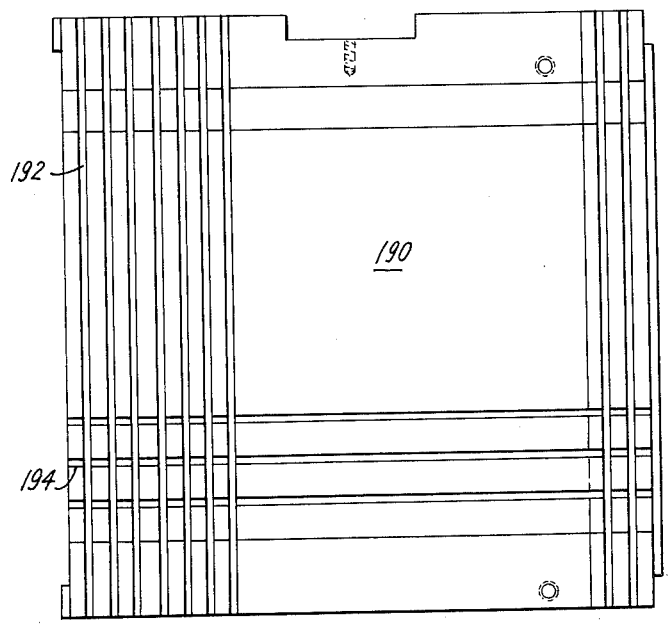
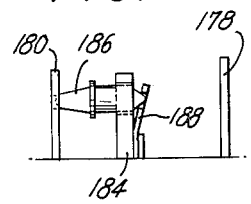
INVENTOR.
WERNER FLIEG
BY
ATTORNEY May 1, 1962 W. FLIEG 3,032,163
DATA RECORDER AND ASSOCIATED METHODS
Filed Nov. 14, 1960 7 Sheets-Sheet 6

INVENTOR.
WERNER FLIEG
BY
ATTORNEY

May 1, 1962 W. FLIEG 3,032,163
DATA RECORDER AND ASSOCIATED METHODS
Filed Nov. 14, 1960 7 Sheets-Sheet 7

INVENTOR.
WERNER FLIEG
BY
ATTORNEY

United States Patent Office 3,032,163
Patented May 1, 1962

3,032,163
DATA RECORDER AND ASSOCIATED METHODS
Werner Flieg, Brookline, Mass., assignor to Invac
Corporation, Natick, Mass.
Filed Nov. 14, 1960, Ser. No. 69,220
28 Claims. (Cl. 197—1.5)

This invention relates to data recorders and to methods associated therewith. This application is a continuation-in-part of application Ser. No. 4,781, filed Jan. 26, 1960 (now abandoned).

In many data processing problems there is a need for storing or recording data. This type of operation is generally effected by the use of a code and more particularly by such means as punched paper tapes, magnetic tapes, cards and so forth.

It is an object of the invention to provide commercially practical apparatus suited to the above-indicated purposes and furthermore, of lower cost to the consumer than currently available apparatus.

It is a further object of the invention to avoid the use of complex mechanical matrices or the like which are employed in conventional data recorders such as tape punches.

Still another object of the invention is to provide for adapting presently available types of apparatus, such as typewriters, for tape punching operations.

In accordance with one embodiment of the invention, the type bars of a conventional typewriter are provided with coded masking elements operatively associated with a photo-sensitive unit for inspecting these elements and controlling a device for punching a paper tape. Special provision is available in accordance with a feature of the invention to provide for separate coding of upper and lower case characters if desired.

In accordance with a preferred embodiment of the invention, however, a photoelectric system is installed beneath the keyboard of a typewriter in such a manner as to avoid interference, in any way, with the operation of the typewriter or with the visibility of the typed data.

According to one feature of the preferred embodiment of the invention the typewriter and photoelectric system are provided as detachable units to facilitate the maintenance thereof.

According to another feature of the preferred embodiment of the invention, the photoelectric system is shielded in order to prevent the entry of foreign matter and ambient light.

A further feature of the preferred embodiment of the invention relates to the particular spatial relationship of the typewriter keyboard and associated photoelectric system, which relationship provides for facile and efficient operation of the photoelectric system.

Still another feature is the efficient use which the preferred embodiment makes of the kinetic energy and momentum of a typing stroke.

A particularly important feature of the preferred embodiment is the provision of separate light or radiated energy channels for the elements of a code in order to prevent "cross-talk" and in order to permit the use of relatively low-magnitude light sources.

Another feature of the invention relates to the provision of a unit which is relatively insensitive to manufacturing tolerances.

Still another feature of the invention relates to the simplicity of the elements which are incorporated into available apparatus for adapting the same.

Other objects and features of the invention as well as advantages thereof will be found in the following detailed description of a preferred embodiment as illustrated in the accompanying drawing in which:

FIGURE 1 is a diagrammatic view of one embodiment of the invention;

FIGURE 2 is a pictorial view of a conventional typewriter illustrating how the same may be physically adapted to incorporate the provisions of the invention;

FIGURE 3 illustrates a punched paper tape as processed by the apparatus of the invention;

FIGURE 4 illustrates a light source and photo-sensitive cell employed in accordance with the invention;

FIGURE 5 is a top view of the structure illustrated in FIG. 4;

FIGURE 6 illustrates the adaptation of a portion of a typewriter in accordance with the provisions of the invention;

FIGURE 7 is a front view of the structure illustrated in FIG. 6;

FIGURE 8 illustrates a modification of the structure in FIGS. 6 and 7;

FIGURE 12 is a side view of a typewriter, diagrammatically shown, incorporating a photoelectric system provided in accordance with the invention to serve in combination with the typewriter as a control for a data recorder;

FIGURE 13 is a front view of a portion of the apparatus illustrated in FIG. 12, showing particularly the front of the photoelectric system;

FIGURE 14 is a top plan view of the photoelectric system of the apparatus of FIG. 12, the apparatus being partially broken away to expose said photoelectric system;

FIGURE 15 is a top plan view partially broken away and partially in section of a light source to be employed in the photoelectric system of the apparatus of FIG. 12;

FIGURE 16 illustrates a detail of FIG. 15 in side view;

FIGURE 17 is a top plan view of a detail of the photoelectric system of FIG. 12 wherein provision is made for light transmission and for coded masking members operative in connection therewith;

Figure 9:
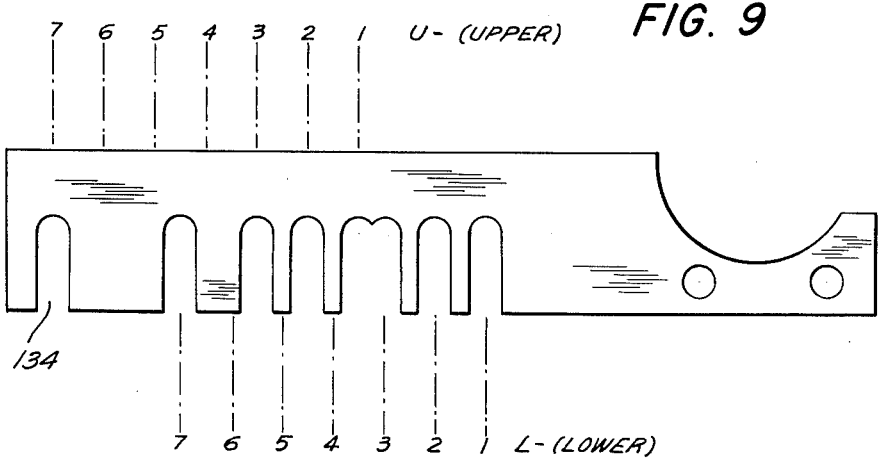
FIGURE 9 illustrates the element which is added to conventional typewriters, particularly to achieve the structure of FIG. 6.

In FIG. 1 a paper tape 20 supported on a punch die 22 is selectively punched by means of pins 24, of which only pins 24a and 24b are shown. The tape is stepped or driven past pins 24 by a conventional sprocket wheel member 26 provided with peripheral teeth 28.

Pins 24a and 24b are respectively controlled by solenoids or electromagnetic devices 30a and 30b and solenoids 30 are, in turn, controlled in accordance with the provisions of the invention.

At 32 is illustrated a type bar of a conventional typewriter. This type bar 32 is mounted on a lever 34 pivotally supported on pivot 36 and actuated through the intermediary of a lever 38 by means of an operating key 40. On the effective face of type bar 32 is provided a raised section 42 constituting a character. Two characters 42 may be provided if desired.

The above structure is of a conventional nature and the details required therefore will be apparent to those skilled in the art.

However, in accordance with one embodiment of the invention, there is additionally provided a unit 44 comprising a source of radiated energy and means responsive to this radiated energy. As will be shown, the positioning of a masking device between said source and the means responsive thereto in accordance with the operation of the typewriter controls the punching of tape 20.

More particularly, there is provided a housing 46 internally accommodating a light source or incandescent bulb 48 adapted to radiate light through opening 50. A power source 52 provides the necessary electrical power for operating this bulb. Opposed to the light source 48 is a housing 54 within which are accommodated a plurality of photo-sensitive elements 56, the number of which depends upon the code being employed with respect to punching the tape 20.

Preferably, the photo-sensitive elements 56 are hermetically sealed-in-glass high-sensitivity junction photo diodes having a built-in lens which focuses light on the sensitive portion of the junction. A commercially available photo diode is Sylvania type 1N77A.

The photo-sensitive elements 56 are employed to control a D.C. voltage provided by a voltage source 58 and an interruption of the light radiated by incandescent bulb 48 with respect to elements 56 will give rise to pulses or voltage changes which are employed to operate solenoids 30 and sprocket wheel 26.

By reason of the low magnitude of the pulses or signals generated by elements 56, amplifiers 60a–c are employed. These amplifiers may be conventional D.C. amplifiers which suitably magnify the amplitude of the signals generated by elements 56.

The operations of pins 24 and sprocket wheel 26 are staggered or sequenced. Thus pins 24 selectively punch tape 20, whereafter the tape 20 is stepped to the next position by means of sprocket wheel 26. To provide for this sequencing of operations, a conventional delay device 62 is provided in series with amplifier 60c so that the signal actuating sprocket wheel 26 is delayed with respect to the signal actuating pins 24.

On type bar 32 is mounted a masking element or plate 64. Plate 64 is rigidly connected with type bar 32 and moves with the latter in the direction indicated by arrow 66 to a position between light source 48 and light-sensitive elements 56. Plate 64 is provided with openings 68 according to a predetermined code so that elements 56 are selectively shielded from light source 48 in accordance with which of the masking elements 70 is between the openings 68. Each type bar 32 is provided with one or more respective characters 42 which are correlated with the code of the openings provided on plate 64.

FIG. 2 illustrates a conventional typewriter 72 provided with keys 74 equivalent to key 40 in FIG. 1. Typewriter 72 is moreover provided with a roll or platen 76 around which a sheet 78 of paper is wound for a conventional typing operation. Elements 46 and 54 are mounted in position by brackets 80 and 82, these brackets being located upon a stationary portion of the typewriter. A plate 64 is shown in FIG. 2 positioned between members 46 and 54 for the control of a tape punching operation. Also illustrated in FIG. 2 are a plurality of levers 34 arranged in conventional manner.

FIG. 3 illustrates tape 20 provided conventionally with a row of small sprocket holes 84 and with a number of larger holes 86 which are punched by pins 24. In the most generally employed commercial arrangement pins 24 will be arranged transverse to the longitudinal direction of tape 20 and when the tape is stepped sequential code groups will be punched into the tape. It will be appreciated that the punching of holes in a paper tape is one specific form of an operation which may hereinafter be particularly designated as establishing indicia on a record medium.

FIGS. 4 and 5 illustrate a specific form which the unit 44 of FIG. 1 may take. In FIGS. 4 and 5 are illustrated housing sections 88 and 90. Section 90 is provided with a vertical bore 92 within which is accommodated an elongated incandescent bulb 94. This bulb constitutes a source of light common to all of the photo-sensitive elements employed.

Section 88 is provided with a plurality of transverse bores 96, one for each photo-sensitive element incorporated into the unit. Photo diodes 98 are shown accommodated in these transverse bores with the lenses 100 directed toward light source 94.

Instead of the separate sections indicated in FIGS. 1 and 2, the unit of FIGS. 4 and 5 is provided with a slot 102 which accommodates the plates on the type bars associated therewith. At the rearmost extremity of slot 102 is provided a resilient pad 104 of rubber or the like which absorbs the impact of the penetrating plate, should the plate physically engage the unit.

A single bracket 106 may be employed to support the above-described unit in place of the separate brackets 80 and 82 of FIG. 2.

Each photo diode 98 is provided with a pair of leads 108 and 110 respectively adapted for connection to the above-noted power source and to one of the amplifiers associated with the punch mechanism.

FIGS. 6 and 7 illustrate in greater detail the manner of adapting a typewriter in accordance with the provisions of the invention. Lever 112 of conventional shape has mounted at its upper extremity a type bar 114 on which are positioned characters 116 and 118. Character 116 as shown in FIG. 7 is the upper case character whereas character 118 is the lower case character.

A plate 120 is integral with or otherwise firmly and rigidly engaged with lever 112 by means of rivets 122 and 124 or the like. Preferably plate 120 is of a rigid material such as a metal which is readily machined to provide notches 126, the purpose of which has been indicated above. As seen in FIG. 7, plate 120 is of minimum thickness so as to facilitate the penetration thereof into slot 102 illustrated in FIGS. 4 and 5.

FIG. 8 illustrates a modification of the structures shown in FIGS. 6 and 7. In this modification notches 128 are provided directly in lever 130 upon which is mounted, in conventional position, a type bar 132. For this type of unit in which the masking member is positioned below the type bar 132, it is necessary to relocate the elements 46 and 54, which, in FIG. 2, are illustrated in position for operation of the structure of FIGS. 6 and 7.

FIG. 9 illustrates the simple element which, in accordance with the first embodiment of the invention, is added to the conventional type bar of a typewriter to adapt the same to the purposes of the invention. It is sufficient to note that elongated notches 134 are actually arranged as two sets of notches respectively corresponding to upper and lower case characters on the associated type bar. This feature of the invention will be further discussed below.

In conventional typewriters, provision is generally made for employing upper and lower case characters selectively by mounting the type bars on a displaceable type bar carrier segment. The structure for such an arrangement is diagrammatically illustrated in FIGS. 10 and 11.

Figure 10:
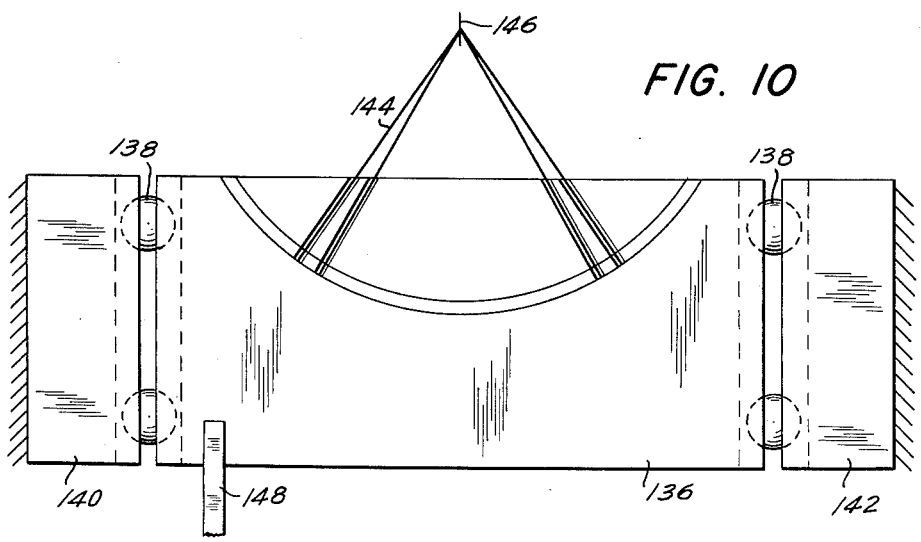
FIGURE 10 illustrates in front view and diagrammatically a portion of a conventional typewriter, the movement of which is correlated to coding provisions of the invention.
Figure 11:
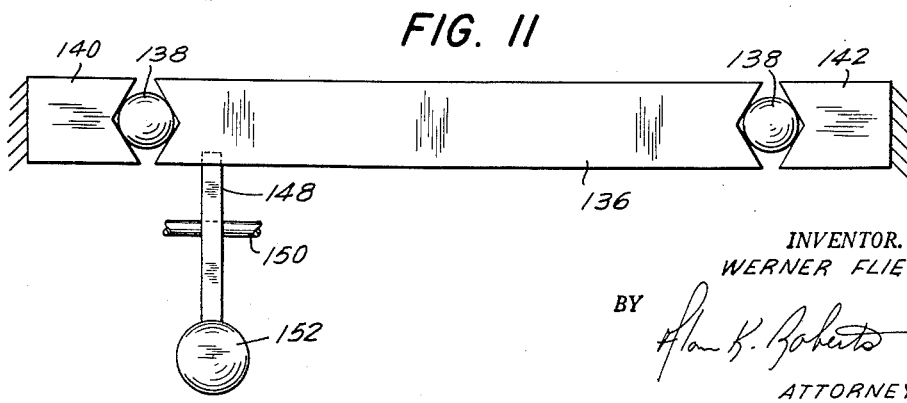
FIGURE 11 is a diagrammatic top view of the structure illustrated in FIG. 10.

In FIGS. 10 and 11 is shown a displaceable segment 136 supported through the intermediary of balls 138 between fixed supports 140 and 142. An inspection of this arrangement will reveal that the segment 136 is thus capable of vertical displacement. Lines 144 indicate the positions of the various levers supported on segment 136 when the associated type bars are projected upwardly to position 146.

Connected to segment 136 is a displacement lever 148 pivoted on pivot 150 and accommodated by a key 152. Key 152 is the "shift" key available on conventional typewriters. A depressing of this key displaces segment 136 relative to the associated platen and therefore shifts the upper and lower case characters relative to the platen so that one or the other of these characters is typed during the associated typing operation.

The vertical displacement which segment 136 is capable of undergoing is determinable. In accordance with the invention it is therefore possible to intersperse two sets of notches 134, as illustrated in FIG. 9, to correspond to upper and lower case characters.

More particularly, numerals 1 to 7 (upper) in FIG. 9 indicate positions on the plate in FIG. 9 opposed to the photo-sensitive elements of FIG. 4 when segment 136 (FIGS. 10 and 11) is positioned for upper case. Numerals 1 to 7 (lower) in FIG. 9 illustrate the positions of said plate for lower case. These positions are interspersed for the respective cases and it is thus possible on the same plate to provide two separate codes which may be different, if desired, for controlling the punching of the associated tape.

FIG. 9 illustrates the case in which the same code is employed for upper and lower case characters, positions 1, 2, 3 and 7 being notched for the upper case characters and the same positions being notched for the lower case characters.

In accordance with the invention the positions for each case are spaced by an amount which is not an integral sub-multiple of the displacement of which segment 136 is capable. This means that the positions of the respective cases are displaced from one another and permits these positions to be interspersed. This constitutes a further feature of the invention.

In operation, the photo-sensitive elements described above are masked or not, according to which typewriter key is depressed, and the masking of the elements provides the selective operation of the solenoids and thus a selective punching of the tape. As has been mentioned above, a delay is provided with respect to the signal applied to the sprocket wheel means employed for stepping the tape. It is also possible to drive the sprocket wheel device from the signal which is generated when the masking element is removed from the photo-sensitive unit. This signal is inherently later than the signal generated when the masking element penetrates the unit and thus automatically attends to the delaying of the tape stepping operation.

The embodiment of the invention described above by way of non-limiting example is one specific form of an apparatus for processing a record medium, which apparatus comprises a plurality of members for establishing indicia on the record medium, means responsive to radiated energy coupled to said members for controlling operation of same, a source of radiated energy operatively disposed with respect to said means, and means to mask the first said means to control the response thereof to the source of radiated energy. The preferred embodiment of the invention will next be described below.

The preferred embodiment of the invention is illustrated in FIGS. 12-24 and may be regarded, according to one aspect of the invention, as apparatus for recording data upon a record medium.

In general this apparatus may be regarded as comprising a typewriter including displaceable type bars and levers operatively coupled to these type bars for displacing the same, with keys being provided on the levers for actuating these levers in order to operate the type bars and to perform an auxiliary function, as will next be indicated.

According to the invention there is provided a source of radiated energy such as light and a plurality of devices responsive to this radiated energy. The devices are operatively disposed with respect to the source, but are spaced therefrom. Furthermore, in accordance with the invention there are provided, as indicated with respect to the previously described embodiment of the invention, a plurality of masking elements adapted for selectively masking the devices from the source of radiated energy.

The masking elements are operatively disposed with respect to the levers and are rendered effective thereby when the levers are actuated by the keys.

In further accordance with the invention, recording elements, such as paper punches, are coupled to and actuated by the devices which are responsive to the radiated energy, as controlled by the selective exposure of the devices to the source of radiated energy.

Viewed according to a different aspect of the invention, there is provided a control for a data recorder, including a plurality of recording elements. This control comprises, on the one hand, a photoelectric unit, and, on the other hand, a typewriter which constitutes a complete and operative unit independently of the photoelectric unit.

The above-noted photoelectric unit includes a light source and a plurality of light-sensitive elements spaced from the source and corresponding to the recording elements of the data recorder. The light-sensitive elements are adapted for connection to the recording elements for controlling the same. The photoelectric unit, moreover, includes masking elements displaceable to positions between the source and light-sensitive elements for selectively masking these light-sensitive elements.

The typewriter of the above-noted control includes key levers disposed to engage and displace the masking elements and type bars operatively associated with these key levers. The masking elements of the photoelectric unit have a coded configuration corresponding with the associated type bars in order to selectively mask the light-sensitive elements from the light source for selective shielding of the light-sensitive elements, according to the characters on the type bars.

Referring next to the drawing, and particularly to FIGS. 12-14, there is illustrated in these figures, by the use of dot-dash lines and in diagrammatical form a typewriter 154.

This typewriter comprises, in conventional arrangement, a platen 156 and key levers 158, with which are operatively associated in known manner type bars (not shown) on which are positioned raised portions representing characters to be typed. The typewriter, moreover, provides for pivotal movement of key levers 158 about a pivot axis 160 under control of keys 162. Each key lever 158 comprises, also in conventional manner, downwardly extending protrusions 164 at a position at which levers 158 extend through a wall portion or bracket 166.

The above-indicated typewriter may be of any conventional structure and is mounted on a base member 168, consisting of a steel sheet or the like, by means of which the typewriter 154 is fixed relative to an associated photoelectric unit 170, with respect to which the typewriter is superposed in accordance with a feature of the invention.

More particularly, the typewriter 154 is superposed with respect to the photoelectric unit 170 in such a manner that the key levers 158 are operatively disposed with respect to displaceable members in the photoelectric unit 170 for operative engagement therewith. This operative engagement will be disclosed in greater detail hereinafter. It is for the present, however, sufficient to note that the photoelectric unit 170 is also fixed to the base member 168 in such a manner that the relative positions of the typewriter 154 and the unit 170 are fixed, both the typewriter 154 and the unit 170 being detachable for purposes of maintenance and repair, or the like.

The photoelectric unit 170 consists generally of a light source unit 172, a unit consisting of light responsive elements generally designated by the reference numeral 174, and a coding section 176. The coding section 176 selectively masks the light-sensitive elements of unit 174 from light source 172 for purposes of controlling recording elements operatively connected with the unit 172 in a manner which was earlier indicated with reference to FIGURE 1.

The light source unit 172 is illustrated in greater detail in FIGS. 15 and 16. In these figures are illustrated a vertical support wall 178 and a perforated front wall 180, provided with a series of aligned openings and supported relative to the wall 178 by means of spacers 182. Supported between spacers 182 is a bulb support wall 184, having a series of openings aligned with the openings in wall 180 and adapted for supporting a series of incandescent bulbs 186. The number of bulbs 186 corresponds to the number of light-sensitive elements in the unit 174 and is correlated to the number of elements employed in the associated code, as has been indicated in a general manner above with respect to the first described embodiment of the invention.

FIGURE 16 indicates generally that spring clips 188 are employed, both to maintain bulbs 186 in position and to make electrical contact therewith, a voltage source being connected to bulbs 186 in conventional manner.

Figure 18:
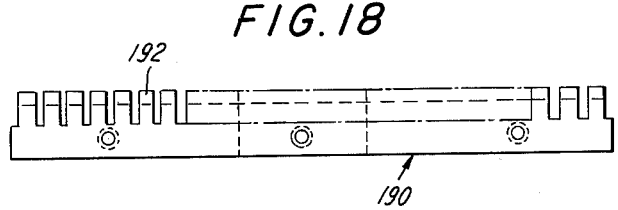
FIGURE 18 is a front view of the detail of FIG. 17.
Figure 19:
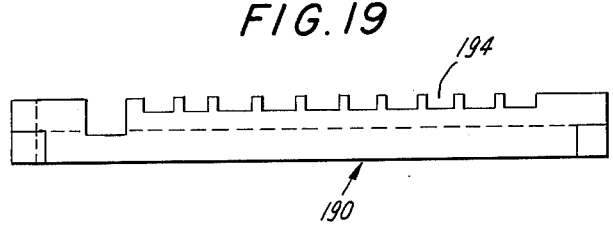
FIGURE 19 is a side view of the detail of FIG. 17.

The coding section 176, which is best seen in FIG. 13, is positioned between the light source unit 172 and the unit 174 and includes a channeled member 190 which is best illustrated in FIGS. 17-19.

In FIGS. 17-19 it is seen that the channeled member 190 is a comparatively heavy body which is preferably of a heat absorbing material such as aluminum or the like. This plate is provided on its upper side with a number of parallel slots 192 which are of a width adapted to accommodate the masking elements which will be described hereinafter. Moreover, the number of slots 192 is directly related to the number of keys and key levers included in the associated typewriter.

The channeled member 190 is also provided with a number of parallel channels 194, corresponding in number to the number of light bulbs or light producing elements included by the light source unit 172.

Channeled member 190, covered by slotted light shield 195, constitutes an important feature of the invention in association with related members which will be described hereinafter. The principal functions of the channeled member 190 are numerous and include providing separate and independent channels for each light source and for each light responsive element in order ot prevent "crosstalk" between the channels and light sources and to make a most efficient use of the light sources by restricting the generated light rays to a given limited path between the source thereof and the element responsive thereto. Moreover, the channels 194 replace expensive optical systems which might be employed in lieu thereof and permit relatively low power light sources to be employed. The channeled member 190 moreover constitutes a heat absorbing means which provides for heat dissipation and therefore avoids the necessity of employing blowers or the like to remove heat generated in the light source unit 172.

Figure 20:
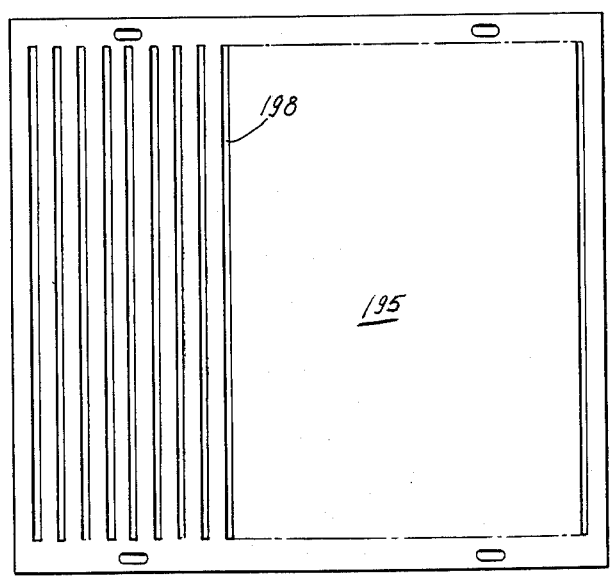
FIGURE 20 is a top plan view of a detail employed with the structure illustrated in FIGS. 17–19.

The shield 195 is illustrated in top plan view in FIG. 20 and is provided with a plurality of parallel slots 198, corresponding in number and position to the slots 192 of channeled member 190 (see FIG. 17).

A shield 196 in the form of an imperforate sheet is supported in cantilever manner on the member 190 by means of fastening elements 200. Shield 196 cooperates with guide or shield section 202 (illustrated in front plan view in FIG. 21) to form a substantially closed shield unit which protects the photoelectric unit 170 from the deleterious effects of foreign matter, such as debris falling from the typewriter 154. Moreover, this shield unit has the function of protecting the photoelectric unit 170 from ambient or stray light which might interfere with the proper operation of the unit 170 and would have harmful effects with respect to the associated recording elements.

Figure 21:
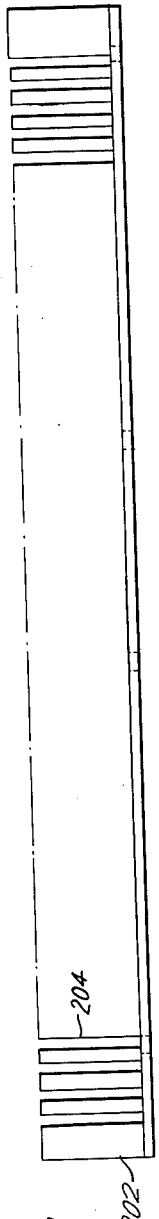
FIGURE 21 is a front view of a further detail employed with the apparatus of FIGS. 17–19.
Figure 22:
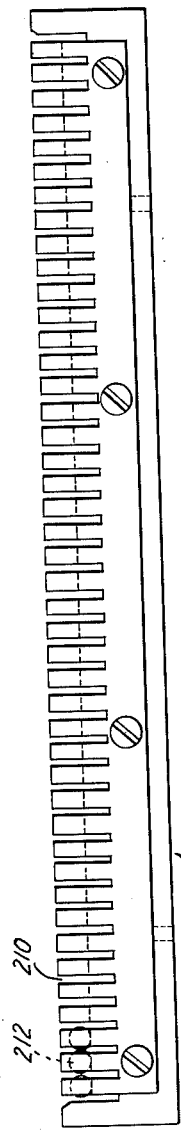
FIGURE 22 is a front view of a further detail employed in association with the photoelectric system of FIG. 12.
Figure 23:
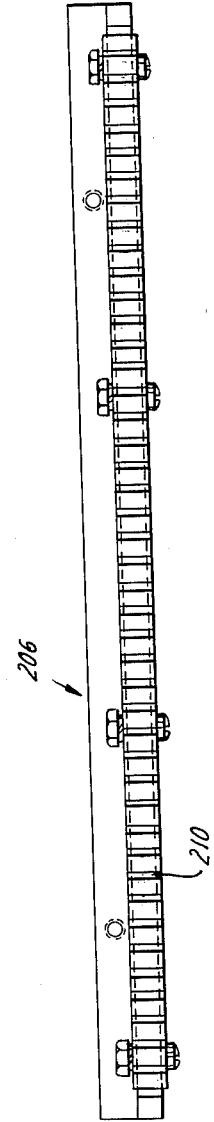
FIGURE 23 is a top view of the structure illustrated in FIG. 22.

The guide or shield section 202 illustrated in FIG. 21 also defines a series of slots designated by the reference numeral 204 and corresponding in position and number to the slots 198 of the shield section 195.

In addition to serving as a section of a unit protecting the photoelectric unit from the effects of foreign matter and ambient light, the element 202 serves the additional purpose of guiding the masking elements employed by the unit 170, as will become apparent hereinafter.

Mounted atop the photoelectric unit 170 and parallel to the channels 194 of channeled member 190, is the key interlock guide 206, the function of which is to permit the operation of only one masking element at a time in response to operation of key levers 158.

Stated otherwise, it is a function of key interlock guide 206 to insure that two masking elements are not operated by the simultaneous depressing of two of the keys 162 such that an improper recording is effected by an improper control of the recording elements associated with the unit of FIGS. 12-24.

To this end the key interlock guide 206 comprises a shell or bent sheet member 208, wherein are formed a plurality of slots 210 (see FIGS. 22 and 23) which correspond in size and number to the slots 192 of channeled member 190.

It will be noted that the key interlock guide 206 is further provided with a series of steel balls 212. The size and number of balls 212 is such that the accumulated spacing of the same can at most amount to a distance corresponding to the width of one slot 210. This means that if one key lever 158 has entered a slot 210, the balls 212 are forced against one another and block the remaining slots 210, thereby preventing entry of a further key lever and thus preventing an inadvertent control of a punching operation by two keys 162 at the same time.

Figure 24:
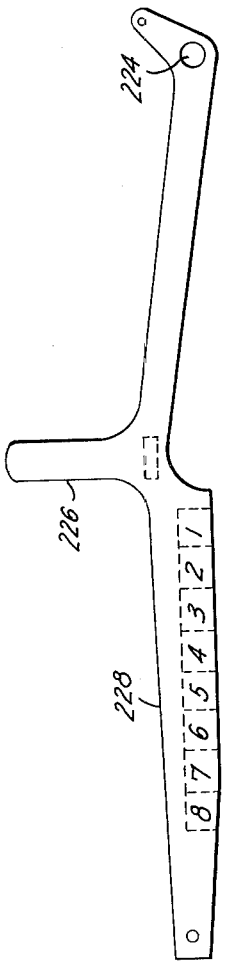
FIGURE 24 illustrates a masking member or element employed in accordance with the invention and adapted for being coded for use in the structure of FIG. 12.

For controllably masking the light responsive elements from the associated light source in cooperation with the above described structural features of the structure of the invention, there are provided a plurality of masking members or elements 214 (see also FIG. 24). Masking elements 214 are mounted on a common shaft 216, defining a pivot axis spaced from the pivot axis 160 noted above. Masking elements 214 are accommodated in the aligned slots of members 190, 195 and 202 and furthermore in corresponding slots in front guide member 218 mounted on base member 168.

Springs 220 are provided for resiliently loading masking elements or levers 214 and are suitably connected between extremities 222 of the masking elements 214 and the base member 168. As best seen in FIG. 24, each masking element 214 is provided with an opening 224 by means of which the masking element is accommodated on shaft 216 (FIG. 12). Moreover, each masking element is further provided with an upwardly extending protrusion 226 by means of which the masking element is engaged by the associated downwardly extending protrusion 164 on the corresponding key lever 158.

Most important each masking element comprises a coding section 228 provided with a number of subdivisions indicated by numbers 1-8 in FIG. 24. These sections are selectively removed as illustrated in Table I, to provide for a selective masking of the light responsive elements from the associated light source.

Table I

| Remove Sections | | | | | | | | Symbols |
|---|---|---|---|---|---|---|---|---|
| 8 | --- | 6 | 5 | 4 | 3 | 2 | --- | = |
| 8 | 7 | --- | --- | 4 | 3 | 2 | 1 | Q |
| 8 | --- | --- | 5 | 4 | 3 | 2 | 1 | A |
| --- | --- | 6 | --- | 4 | --- | 2 | --- | 2 " |
| 8 | 7 | --- | --- | --- | 3 | 2 | --- | Z |
| 8 | 7 | --- | --- | 4 | --- | --- | 1 | W |
| 8 | --- | --- | --- | 4 | 3 | --- | 1 | S |
| --- | --- | 6 | --- | 4 | --- | --- | 1 | 3 : |
| 8 | --- | --- | --- | 4 | --- | --- | --- | X |
| 8 | 7 | --- | 5 | 4 | --- | 2 | 1 | E |
| --- | --- | --- | 5 | 4 | 3 | --- | --- | D |
| --- | 7 | 6 | --- | 4 | --- | --- | --- | 4 $ |
| 8 | 7 | --- | 5 | 4 | 3 | --- | 1 | C |
| 8 | --- | --- | --- | 4 | 3 | 2 | --- | R |
| 8 | --- | --- | 5 | 4 | --- | 2 | --- | F |
| --- | 7 | 6 | --- | --- | 3 | 2 | 1 | 5 % |
| 8 | 7 | --- | --- | 4 | --- | 2 | --- | V |
| 8 | 7 | --- | --- | 4 | 3 | --- | --- | T |
| 8 | --- | --- | 5 | 4 | --- | --- | 1 | G |
| --- | --- | 6 | --- | --- | 3 | 2 | --- | 6 ; |
| 8 | 7 | --- | 5 | 4 | --- | --- | 1 | B |
| 8 | --- | --- | 5 | 4 | --- | --- | --- | Y |
| --- | --- | 6 | --- | --- | 3 | --- | 1 | H |
| 8 | --- | --- | --- | --- | 3 | --- | --- | 7 0 |
| 8 | 7 | --- | 5 | --- | --- | 2 | --- | N |
| 8 | --- | --- | --- | 4 | --- | 2 | 1 | U |
| 8 | --- | --- | 5 | --- | 3 | 2 | --- | J |
| --- | 7 | 6 | --- | --- | 3 | --- | --- | 8 ' |
| 8 | --- | --- | 5 | --- | --- | 2 | 1 | M |
| 8 | 7 | --- | 5 | --- | 3 | 2 | 1 | I |
| 8 | --- | --- | 5 | --- | 3 | --- | 1 | K |
| --- | --- | 6 | --- | --- | --- | 2 | 1 | 9 - |
| --- | 7 | 6 | --- | --- | --- | 2 | --- | * |
| 8 | 7 | --- | 5 | --- | --- | --- | 1 | O ' |
| 8 | 7 | --- | 5 | --- | --- | --- | --- | L |
| --- | --- | 6 | --- | 4 | 3 | --- | --- | 0 ( |
| 8 | --- | 6 | 5 | --- | --- | --- | 1 | . |
| 8 | --- | --- | 5 | --- | --- | --- | --- | P |
| --- | 7 | --- | --- | --- | --- | 2 | 1 | : |
| --- | 7 | 6 | --- | 4 | --- | 2 | 1 | i ) |
| 8 | 7 | 6 | --- | 4 | 3 | --- | 1 | / |
| 8 | --- | --- | --- | --- | --- | 2 | --- | ≥ |
| 8 | --- | --- | --- | --- | --- | --- | 1 | ≤ |
| 8 | 7 | 6 | --- | --- | --- | --- | 1 | # |

The masking element 214 illustrated in FIG. 12 is one example of a completed masking element, the blank for which is illustrated in FIG. 24.

In addition to the structure noted above the unit further comprises, as illustrated in FIG. 12, an angle 230 which extends upwardly above the masking elements and limits the upward travel thereof under the influence of springs 220. The angle 230 is provided with a resilient or yieldable member in the form of a rubber pad 232, the function of which is to absorb the impact of the elements 214 when they rise to inactive position.

There is a very particular relationship provided between the typewriter 154 and the photoelectric unit 170. More particularly, this relationship exists between the downwardly extending protrusion 164 on key levers 158 and the upwardly extending protrusions 226 on the masking elements 214.

Key levers 158 have each an operational stroke having a determinable length of travel equal to the sum of S1 and S2 (see FIG. 12). Distance S1 is twice distance S2 and constitutes about two-thirds the operational stroke of each key lever 158.

It has been determined that distance S1 constitutes the length of free travel of each key lever 158 and that an operational stroke continues through distance S2 by virtue of the momentum gained while traveling through distance S1.

In order to take full advantage of the momentum gained by levers 158 during natural operations, and in order to avoid the necessity for compensating or making other provisions for operation of masking elements 214, the upper extremities of upwardly extending protrusions 226 are positioned for engagement by protrusions 164 of key levers 158 at approximately the position required for permitting the free travel of key levers 158 in response to engagement of the associated keys 162.

Stated otherwise, protrusions 226 are spaced by approximately two-thirds of the operational strokes of levers 158 from the latter, in order to gain the full benefit of the momentum acquired by levers 158 when operated by keys 162. This constitutes an important feature of the invention which avoids the need for supplying additional manual power for operation of the photoelectric unit 170 provided in accordance with the invention.

The details of light-sensitive unit 174 will be apparent from an inspection of FIG. 4 of the first described embodiment of the invention, since unit 174 may be similar thereto or may be provided in various other ways which will be apparent to those skilled in the art. It is also essential to note that the light-sensitive elements comprised by unit 174 are associated with solenoids or electromagnetic units in the manner diagrammatically illustrated in FIG. 1.

In operation keys 162 of typewriter 164 will be depressed in the conventional manner of operating a typewriter. In response to operation of keys 162, key levers 158 will be pivoted about pivot axes 160 and will engage protrusions 226 of masking elements 214 selectively, in accordance with the operation of keys 162.

Masking elements 214 will be selectively pivoted about shaft 216 and will enter the slots 192 of channeled member 190. Since the masking elements have been selectively coded in accordance with the associated characters on the associated type bars, channels 194 will be selectively blocked and light will not pass from the light source 172 to selected of the light-sensitive elements of the unit 174. This will cause a selective operation of the associated recording elements and thus a selective punching of a tape in a manner which has already been indicated in this text.

The general aspects of the preferred embodiment of the invention have been noted above. Attention is, however, directed to the fact that this invention provides for various features which will be next noted hereinunder.

For example, it is to be noted that each key lever 158 is mounted for pivotal movement about a pivot axis 160 which is spaced from the pivot axis defined by shaft 216 supporting masking elements 214. This means that the typewriter and photoelectric unit can be maintained as separate units and that the units can be detached from one another for repair and maintenance, without disturbing either of the two independent elements of the overall structure.

Moreover, it will be noted that the masking elements are positioned beneath the key levers 158, so that the typewriter 154 can be readily removed from its position above the photoelectric unit 170 whereby the latter is exposed for replacement of the various components as well as for general maintenance and supervision.

In addition attention is again directed to the fact that there is provided a channeled member 190 wherein are provided separate and independent or distinct channels for each and every light source and associated light-sensitive element. This, as noted above, prevents cross-talk between the different channels and provides for efficient use of radiated energy which in turn permits the use of relatively low-power light sources as well as avoids the use of expensive optical systems.

A further feature of the invention relates to the provision of a shielded and substantially completely enclosed photoelectric unit, the shield defining openings only for the entry of masking elements and therefore protecting the above-noted light channels from foreign matter and ambient light.

A further feature of the invention relates to the fact that the photoelectric unit thereof can be designed for use with any conventional typewriter which is merely fixed relative to the associated photoelectric unit by the use of a common base such as the base member 168 illustrated in FIG. 12.

The particular relationship of the protrusions 164 and 226 is also to be noted in connection with this invention, since it not only makes full use of the momentum normally acquired by key levers 158 but moreover assures that a punching operation is not initiated without an associated typing operation having taken place.

Finally, it is to be noted that provision for upper and lower case characters is readily enabled in accordance with the invention. For example, the upper case key conventionally provided in commercially available typewriters can be employed to generate an electrical signal which operates in association with the signals generated by unit 174 to control upper or lower case selection.

There will now be obvious to those skilled in the art many modifications and variations of the structure set forth above. These modifications and variations will not, however, depart from the scope of the invention if they are defined by the following claims:

What is claimed is:

1. Apparatus for recording data comprising a typewriter, said typewriter including displaceable type bars having thereon spaced characters, a platen, means supporting said bars and platen for relative displacement therebetween whereby the spaced characters are selectively rendered effective, and keys connected to the type bars for urging the latter towards said platen along determinable converging paths; a source of light radiating light transverse to said paths, a plurality of light responsive members opposed to said source, masking members connected to and displaceable with said type bars to positions between said source and light responsive members, said masking members being adapted to shield selected of said light responsive members according to a predetermined code, and punch elements coupled to and controlled by said light responsive members.

2. Apparatus as claimed in claim 1 wherein said masking members each include two sets of masking elements offset from each other, said means permitting a displacement between the bars and platen of a magnitude adapted for the selective alignment of the sets with said light responsive members.

3. Apparatus as claimed in claim 1 comprising a sprocket wheel means operatively associated with said punch elements and adapted for driving a record medium past the same, and a further light responsive member opposed to said source and coupled to said sprocket wheel means for controlling the same.

4. Apparatus as claimed in claim 3 comprising a delay means coupling said further light responsive means to said sprocket wheel means to sequence the operation of the latter with respect to the operation of said punch elements.

5. Apparatus as claimed in claim 1 wherein said masking members are flat plates provided with peripheral notches.

6. Apparatus as claimed in claim 5 wherein said plates are fixed to said type bars.

7. Apparatus as claimed in claim 1 comprising a casing having aligned openings, said light responsive members being housed in said openings.

8. Apparatus as claimed in claim 7 wherein said casing is provided with a slot transverse to said openings, said casing being positioned so that said slot receives said masking members.

9. Apparatus as claimed in claim 8 comprising a resilient pad in said slot for the impact of said masking members.

10. For use with a typewriter adapted for multiple data recording purposes, apparatus comprising a type bar having at least one character thereon, a plate connected to the type bar and provided with at least one opening therein, means supporting the type bar for movement along a determinable path, and a light source and photo-sensitive cell straddling said path and being in operative association with each other and with said plate so as to generate an electrical signal in response to said plate.

11. A method of punching a paper tape comprising attaching to the type bars of a typewriter elements having light permeable and impermeable sections according to a predetermined code, photoelectrically inspecting said sections as the type bars are operated, and controlling the punching of said tape in accordance with the results of the inspection.

12. Apparatus for recording data comprising a typewriter including displaceable type bars, levers operatively coupled to said type bars for displacing the same and keys on said levers for actuating the same; a source of radiated energy, a plurality of devices responsive to said radiated energy, said devices being operatively disposed with respect to said source but spaced therefrom, a plurality of masking elements adapted for selectively masking said devices from said source and operatively disposed with respect to and rendered effective by said levers with the latter actuated by said keys, recording elements coupled to and actuated by said devices in accordance with the selective exposure of the devices to said source, and means pivotally supporting said levers and masking elements on spaced pivot axes.

13. Apparatus as claimed in claim 12, wherein said masking elements are positioned beneath said levers.

14. Apparatus as claimed in claim 13 comprising, between said devices and source, means defining a separate and distinct channel for each device to guide said energy to the same.

15. Apparatus as claimed in claim 14, comprising a shield over the channels, said shield protecting the channels from foreign matter and ambient energy.

16. Apparatus as claimed in claim 15, comprising, on each masking element, an upwardly extending protrusion for engagement by the associated lever.

17. Apparatus as claimed in claim 16, comprising a base member supporting said typewriter, masking elements and means and fixing the relative positions of the same.

18. Apparatus as claimed in claim 17, comprising springs coupled to said masking elements and urging the same to inactive positions.

19. Apparatus as claimed in claim 18 comprising yieldable members for engaging the masking elements as the latter return to inactive position to cushion the same.

20. Apparatus as claimed in claim 19, comprising guides for said masking elements to guide the displacement of the same.

21. Apparatus for recording data comprising a typewriter including displaceable type bars, levers operatively coupled to said type bars for displacing the same and keys on said levers for actuating the same; a source of radiated energy, a plurality of devices responsive to said radiated energy, said devices being operatively disposed with respect to said source but spaced therefrom, a plurality of masking elements adapted for selectively masking said devices from said source and operatively disposed with respect to and rendered effective by said levers with the latter actuated by said keys, and recording elements coupled to and actuated by said devices in accordance with the selective exposure of the devices to said source, said levers having operational strokes of determinable length and said masking elements being disposed to be engaged by the associated levers with the latter displaced by about two-thirds of said length.

22. Apparatus as claimed in claim 21, comprising means for preventing the actuation of more than one masking element at a time.

23. A control for a data recorder including a plurality of recording elements, said control comprising a photoelectric unit including: a light source and a plurality of light-sensitive elements spaced from said source and corresponding to said recording elements, said light-sensitive elements being adapted for connection to and for controlling said recording elements, and masking elements displaceable to positions between said source and light-sensitive elements for selectively masking the latter; and a typewriter constituting a complete and operative unit independently of said photoelectric unit, said typewriter including key levers disposed to engage and displace said masking elements and type bars operatively associated with said key levers; said masking elements having a coded shape corresponding with the associated type bars.

24. A control as claimed in claim 23, comprising a shield on said photoelectric unit shielding the same from foreign matter and ambient light.

25. A control as claimed in claim 23, comprising means defining separate and independent channels between said source and light-sensitive elements.

26. A control for a data recorder, comprising a typewriter including levers displaceable to perform typing operations and a substantially completely enclosed photoelectric control means adapted for connection to and control of said data recorder, said means including displaceable members disposed for engagement by said levers, said levers having operational strokes of a determinable length and said displaceable members being spaced from said levers by about two-thirds of said length.

27. Data recording apparatus, comprising independent units fixed relative to each other and each including displaceable members operatively disposed so that movement of the members of one unit causes movement of corresponding members in the other unit, photoelectric means operatively disposed for being controlled by the members of said other unit, data recording elements coupled to and controlled by said means, the latter said members being individually coded for selectively controlling said recording elements, and interlock means operatively disposed with respect to the members of one of the units to prevent displacement of more than one of the latter at a time.

28. Apparatus as claimed in claim 27, wherein said interlock means is provided with openings to receive and guide the members which said interlock means controls, said interlock means comprising a series of balls adjacent and adapted for blocking said openings and having a cumulative spacing adapted for accommodating no more than one of the latter said members whereby the entry of one of said members into one of the openings precludes the entry of additional members into other of the openings.

References Cited in the file of this patent

UNITED STATES PATENTS

| | | |
|---|---|---|
| 2,408,754 | Bush | Oct. 8, 1946 |
| 2,749,985 | Johnson | June 12, 1956 |